United States Patent [19]

Cseri

[11] Patent Number: 4,858,638
[45] Date of Patent: Aug. 22, 1989

[54] FAST-ACTING QUICK RELEASE VALVE

[75] Inventor: Zoltan Cseri, Northbrook, Ill.

[73] Assignee: Sloan Valve Company, Franklin Park, Ill.

[21] Appl. No.: 269,297

[22] Filed: Nov. 10, 1987

[51] Int. Cl.⁴ .......................................... G05D 11/00
[52] U.S. Cl. .................................. 137/115; 137/854; 137/116
[58] Field of Search .................. 137/512.1, 854, 115, 137/116, 102

[56] References Cited

U.S. PATENT DOCUMENTS

| 881,234 | 3/1908 | Fusch | 137/512.1 |
| 2,925,093 | 2/1960 | Brand | 137/854 |
| 3,687,153 | 8/1972 | Gold | 137/115 |
| 4,246,933 | 1/1981 | Taylor | 137/596.2 |
| 4,677,447 | 6/1987 | Nielsen | 137/854 |

Primary Examiner—A. Michael Chambers
Attorney, Agent, or Firm—Kinzer, Plyer, Dorn, McEachran & Jambor

[57] ABSTRACT

A quick release valve for a pneumatic air system has a housing with a chamber. There is an air inlet, an air outlet and an exhaust opening, all in communication with the chamber. A seal is positioned to close the exhaust opening. There is a shuttle movable within the housing chamber and having a shuttle chamber, an air inlet in communication with the shuttle chamber and air outlets communicable with the shuttle chamber. The shuttle air outlets are in communication with the housing air outlet and the shuttle air inlet is in communication with the housing air inlet. There is an elastomeric valve which controls the shuttle air outlets. The shuttle has a first position wherein housing air inlet pressure is less than housing air outlet pressure in which the elastomeric valve closes the shuttle air outlets and the housing air outlet is in communication with the housing exhaust opening. The shuttle has a second position wherein the housing air inlet pressure is greater than housing air outlet pressure in which the shuttle and the seal close the exhaust opening and the housing air inlet/outlet pressure differential causes the elastomeric valve to open, permitting air to flow from the housing air inlet, through the shuttle air inlet, shuttle chamber and shuttle air outlets to the housing air outlet.

12 Claims, 1 Drawing Sheet

FAST-ACTING QUICK RELEASE VALVE

SUMMARY OF THE INVENTION

The present invention relates to quick release valves for use in pneumatic air systems.

A primary purpose of the invention is a quick release valve which is simple in construction, reliably operable and which functions at minimum air pressure differentials.

Another purpose is a quick release valve which is small in size, easily incorporated with other devices in a pneumatic air system, for example such as a gladhand forming a part of a vehicle air brake.

Another purpose is a quick release valve having an interior movable shuttle which uses an elastomeric valve as a means for controlling air flow through the shuttle.

Another purpose is a quick release valve of the type described in which the elastomeric valve is formed of stretchable bands.

Another purpose is a quick release valve of the type described which utilizes only a shuttle to control the flow of air between the housing air inlet, housing air outlet and housing exhaust opening.

Other purposes will appear in the ensuring specification, drawings and claims.

BRIEF DESCRIPTION OF THE DRAWINGS

The invention is illustrated diagrammatically in the following drawings wherein.

DESCRIPTION OF THE PREFERRED EMBODIMENT

The present invention relates to a quick release valve and in one application may be combined with the gladhand of a vehicle for use in tractor/trailer heavy duty brake systems. The invention, however, has substantially wider application and may be used in any type of pneumatic air system, as the invention provides a simply constructed, reliable quick release valve.

In FIGS. 1-4 a housing is indicated at 10 and has an air inlet 12, an air outlet 14 and an exhaust opening 16. All three openings are in communication with an interior chamber 18.

Figure 3:
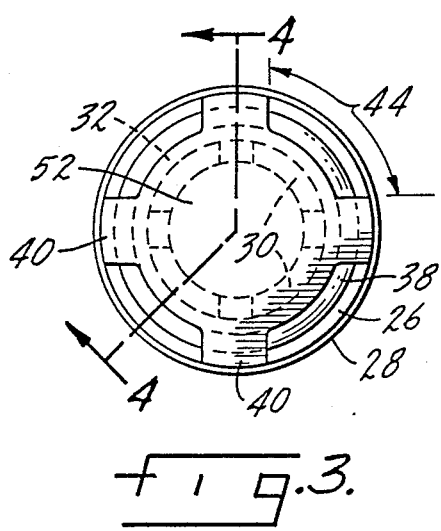
FIG. 3 is a bottom view, on an enlarged scale, of the shuttle used in the embodiment of FIGS. 1 and 2.
Figure 4:
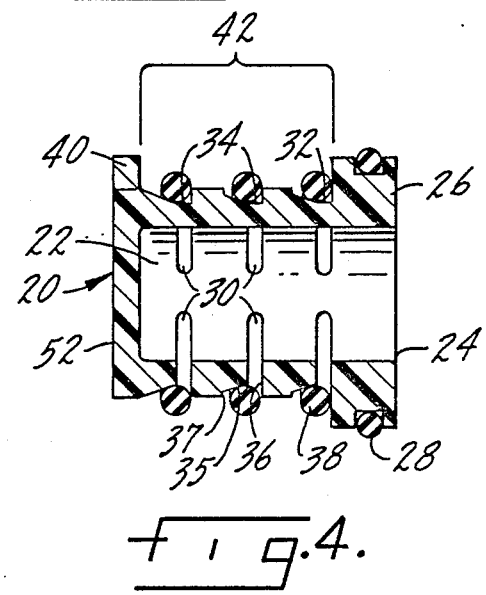
FIG. 4 is a section along plane 4—4 of FIG. 3.

Positioned within chamber 18 is a shuttle 20 illustrated in greater detail in FIGS. 3 and 4. The shuttle, which may conveniently be formed of a plastic material, has a shuttle chamber 22 and an air inlet 24 which connects chamber 22 with housing air inlet 12. The shuttle has an annular flange 26 at the inlet end and a seal ring 28 positioned within a groove in flange 26 such that the seal ring seals against the interior of housing chamber 18. Shuttle 20 may have a plurality of outlet openings 30 which may be in three circumferentially extending groups, there being four such openings in each group. The invention should not be limited to any particular disposition of air outlets, although the present arrangement has been found to be advantageous. Outlet openings 30 are in communication with the bottom of irregularly-shaped grooves 32, there being three such grooves formed on the exterior of the shuttle. Each of the grooves has a flat bottom portion 34, directly in alignment with openings 30. There is an adjacent slanted portion 35 and side walls 36 and 37. The space between walls 36 and 37 is wider than the diameter of the O-ring 38 which is positioned within each groove. The O-rings function as elastomeric valves.

The exhaust end of the shuttle has a plurality of outwardly-extending lugs 40, particularly shown in FIG. 3, which bear against the interior wall of chamber 18 to align the shuttle as it moves within the chamber. There is a circumferentially extending recess 42 extending about the periphery of the shuttle which is in communication with housing outlet 14, and, through the spaces 44 between lugs 40, is in communication with exhaust opening 16 in one position of the shuttle.

At the exhaust end of housing 10 there is a closure which consists of a ring 46 having a central air passage 48, with the ring mounting a seal 50 positioned for contact with face 52 of shuttle 20. Seal 50 is held in position between ring 46 and a shoulder 54 of housing 10. Ring 46 is held in position by a collar 56 engaged with threads 58 formed about the exhaust opening. Collar 56 has a plurality of openings 60 and there may be a conventional flapper valve 62, formed of rubber, which normally closes air passages 60 and thus the exhaust opening in the quick release valve 10.

Figure 1:
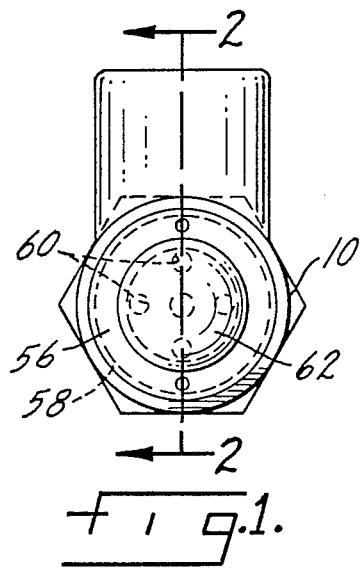
FIG. 1 is a top view of a quick release valve of the type described.
Figure 2:
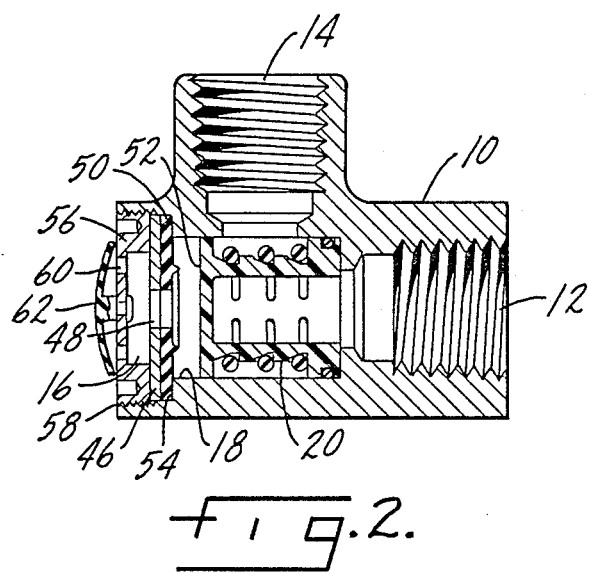
FIG. 2 is an axial section along plane 2—2 of FIG. 1.

Shuttle 20 has two static positions within the quick release valve. In the position of FIG. 2, pressure at housing inlet 12 is less than that at housing outlet 14. Seal 28 prevents air from passing around the shuttle and O-rings 38 prevent air from passing through the shuttle. Housing outlet 14 is in communication with exhaust opening 18 through the annular space 42 about the shuttle, and then through spaces 44.

When pressure at air inlet 12 is greater than that at outlet 14, the shuttle will be moved so that face 52 will close upon seal ring 50, thus closing the exhaust port. The air which passes into the shuttle through shuttle inlet 24 will have the effect of stretching or expanding O-rings 38 causing the rings to roll off openings 30. The rings will be moved in the oversized grooves 32 so that they are positioned on slanted portions 35 and directly adjacent walls 37. Air will then pass through shuttle outlets 30, past the O-rings 38, and then to housing outlet 14. O-rings 38 function as valves in that they are closed when the shuttle is in the FIG. 2 position and open when the shuttle closes the exhaust opening.

Figure 5:
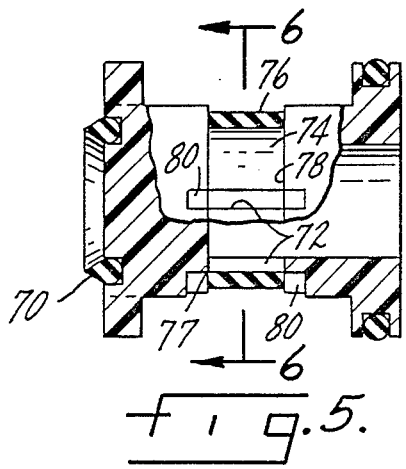
FIG. 5 is a partial section through a modified shuttle for use in a quick release valve of the type shown in FIGS. 1 and 2.
Figure 6:
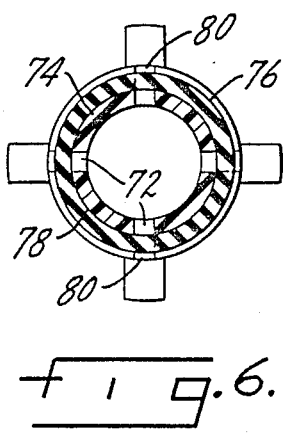
FIG. 6 is a section along plane 6—6 of FIG. 5.

In the embodiment of FIGS. 5 and 6, the seal 70 closing the exhaust opening has been placed on one end of the shuttle, as indicated. The function is the same as in the FIG. 1-4 embodiment. The generally grooves of the FIG. 1-4 shuttle have been replaced by a plurality of circumferentially-extending openings 72, and four such openings are shown herein, although there may be more or less. There are ribs 74 between the openings and there is a rubber or elastomeric band 76 which fits within a groove 78 which extends circumferentially about the exterior of the shuttle at the location of openings 72. Band 76 also functions as an elastomeric valve and as shown in FIG. 5 will close openings 72. There are a plurality of laterally-extending recesses 80, extending in each direction from groove 78, which openings are normally closed by the edges 77 of band 76.

The shuttle shown in FIGS. 5 and 6 operates in the same general manner as the shuttle shown in FIGS. 1-4. Elastomeric valve 76 will normally close the shuttle outlets. When air pressure at housing inlet 12 is greater than pressure at housing outlet 14, the air within the interior of the shuttle will cause band 76 to stretch or expand an amount sufficient to place laterally-extending recesses 80 in communication with circumferentially-extending groove 78. In this way, there is a path for air flow from the housing inlet, through the shuttle inlet, into the interior of the shuttle, and then through shuttle openings 72 to housing outlet 14. Both shuttles have two positions, one in which the outlet is connected to the exhaust opening and the other in which the outlet is connected to the inlet. In both cases expandable rubber elements are used as the valving member. The shuttle of FIGS. 1-4 has three spaced O-rings, whereas, the shuttle of FIGS. 5 and 6 has a single elastomeric band extending circumferentially about the shuttle and masking or closing the shuttle outlets. In the FIG. 1-4 embodiment, when inlet pressure is greater than outlet pressure, the O-rings will stretch or expand, and in the FIG. 5 and 6 embodiment, under the same conditions rubber band 76 will flex or stretch and slightly expand so that there is communication between recesses 80 and shuttle openings 72.

The present invention provides a simply constructed, reliable quick release valve. The shuttle is lightweight, made of plastic, and reliably functions with very small air pressure differentials. The valve closing seal bands or rings are not subject to wear as they do not bear upon any wearing surface. They do not contact the interior of the housing chamber, and are only flexed or expanded during operation.

Whereas the preferred form of the invention has been shown and described herein, it should be realized that there may be many modifications, substitutions and alterations thereto.

The embodiments of the invention in which an exclusive property or privilege is claimed are defined as follows:

1. A quick release valve for a pneumatic air system includes:

a housing, a chamber in said housing, an air inlet opening into said chamber, an air outlet opening into said chamber, an exhaust opening communicating with said chamber and a seal positioned to close said exhaust opening, a shuttle movable within said housing chamber and having a shuttle chamber and an air inlet connecting said housing air inlet and said shuttle chamber, shuttle air outlets positioned circumferentially about said shuttle and communicable between said shuttle chamber and housing air outlets, and an elastomeric valve member positioned about said shuttle and masking said shuttle air outlets to control the opening thereof, said shuttle having a first position wherein housing air inlet pressure is less than housing air outlet pressure in which said elastomeric valve member closes said shuttle air outlets and said housing air outlet is in communication with said housing exhaust opening, said shuttle having a second position wherein housing air inlet pressure is greater than housing air outlet pressure in which said shuttle and seal close said exhaust opening and the housing inlet/outlet pressure differential causes said elastomeric valve member to permit air to flow from said housing air inlet, through said shuttle air inlet, shuttle chamber and shuttle air outlets to said housing air outlet.

2. The quick release valve of claim 1 further characterized by and including an annular groove extending about said shuttle, with said shuttle air outlets opening into said annular groove, said elastomeric member being seated within said annular groove.

3. The quick release valve of claim 2 further characterized in that said annular groove has a width greater than the width of said elastomeric member.

4. The quick release valve of claim 3 further characterized in that said elastomeric member is an O-ring, said annular groove having an irregular shape permitting said O-ring to roll away from the shuttle air outlets.

5. The quick release valve of claim 1 further characterized in that said shuttle air outlets are positioned in a plurality of circumferential groups, each extending about said shuttle, and a plurality of elastomeric members, each extending about said shuttle and each masking one of said circumferential groups of air outlets.

6. The quick release valve of claim 5 further characterized by and including a plurality of annular grooves extending about said shuttle, the air outlets opening into said circumferential grooves, each groove having an elastomeric member positioned therein to mask said air outlets.

7. The quick release valve of claim 1 further characterized in that said exhaust opening seal extends about said exhaust opening on said housing.

8. The quick release valve of claim 1 further characterized in that said exhaust opening seal is positioned on said shuttle and extends about said exhaust opening when said shuttle closes upon said exhaust opening.

9. The quick release valve of claim 1 further characterized by and including an annular groove extending about said shuttle, said shuttle air outlets opening into said annular groove, said elastomeric valve extending about said shuttle exterior and being positioned within said annular groove, and a plurality of laterally extending recesses in communication with said annular groove and extending outside of said elastomeric valve.

10. The quick release valve of claim 9 further characterized in that said laterally extending recesses extend in both directions away from said annular groove and extend outside of said elastomeric valve.

11. The quick release valve of claim 1 further characterized by and including a peripheral seal on said shuttle in sealing engagement with said housing chamber adjacent said housing air inlet.

12. The quick release valve of claim 1 further characterized in that said elastomeric valve member never contacts said housing chamber.

* * * * *